United States Patent
Lair

(10) Patent No.: US 7,149,552 B2
(45) Date of Patent: Dec. 12, 2006

(54) WIRELESS HEADSET FOR COMMUNICATIONS DEVICE

(75) Inventor: John Lair, Salt Lake City, UT (US)

(73) Assignee: Radeum, Inc., Orem, UT (US)

( * ) Notice: Subject to any disclaimer, the term of this patent is extended or adjusted under 35 U.S.C. 154(b) by 0 days.

(21) Appl. No.: 10/828,480

(22) Filed: Apr. 21, 2004

(65) Prior Publication Data

US 2005/0064915 A1 Mar. 24, 2005

Related U.S. Application Data

(60) Provisional application No. 60/503,949, filed on Sep. 19, 2003, provisional application No. 60/527,776, filed on Dec. 9, 2003.

(51) Int. Cl.
*H04M 1/00* (2006.01)

(52) U.S. Cl. .................. 455/569.1; 455/518; 455/521; 455/575.2; 455/74.1

(58) Field of Classification Search ............. 455/556.1, 455/74, 90.2, 78, 100, 575.2, 569.1, 575.1, 455/41.2, 550.1, 568, 41, 66, 550, 569, 74.1, 455/557, 518, 521; 379/430, 428.2, 433.02; 375/334, 341

See application file for complete search history.

(56) References Cited

U.S. PATENT DOCUMENTS

| | | | |
|---|---|---|---|
| 4,132,861 A | 1/1979 | Frieder, Jr. et al. | |
| 5,101,504 A * | 3/1992 | Lenz ........................... | 455/78 |
| 5,118,309 A | 6/1992 | Ford | |
| 5,265,264 A | 11/1993 | Dzung et al. | |
| 5,276,916 A | 1/1994 | Pawlish et al. | |
| 5,448,620 A | 9/1995 | Gershkovich et al. | |
| 5,479,474 A | 12/1995 | Schwartzman et al. | |
| 5,659,156 A | 8/1997 | Mauney et al. | |
| 5,748,707 A | 5/1998 | Sanserino | |
| 5,771,438 A | 6/1998 | Palermo et al. | |
| 5,790,681 A | 8/1998 | Leppälahti | |
| 5,912,925 A | 6/1999 | Palermo et al. | |
| 5,969,698 A | 10/1999 | Richard et al. | |
| 5,982,764 A | 11/1999 | Palermo et al. | |
| 5,987,146 A | 11/1999 | Pluvinage et al. | |
| 6,104,816 A | 8/2000 | Downs, Jr. et al. | |
| 6,121,881 A | 9/2000 | Bieback et al. | |
| 6,230,029 B1 * | 5/2001 | Hahn et al. ............... | 455/575.2 |

(Continued)

FOREIGN PATENT DOCUMENTS

JP 10150694 6/1998

OTHER PUBLICATIONS

Susan Brown, "A—Technology Briefing: Wireless Communications Headset Subsystem to Enhance Signal Conditioning" Nov. 14, 2000.*

(Continued)

*Primary Examiner*—Duc M. Nguyen
*Assistant Examiner*—Wayne Cai
(74) *Attorney, Agent, or Firm*—Hunton & Williams LLP

(57) ABSTRACT

Disclosed herein is a communications system implementing a headset wirelessly connected to a half-duplex communications device, such as a two-way radio or a radio-simulating cellular phone. The headset may incorporate a transmit/receive switch wherein a transmit signal is wirelessly transmitted from the headset to the communications device to direct the communications device to enter into a transmit mode. Alternatively, a wireless transmit/receive switch may be implemented separately from the wireless headset, where the wireless transmit/receive switch may be positioned in the proximity of the communications device and the headset and may be engaged by a user to direct the communications device to enter a transmit mode.

14 Claims, 14 Drawing Sheets

U.S. PATENT DOCUMENTS

| | | | |
|---|---|---|---|
| 6,298,249 | B1 | 10/2001 | Locarno et al. |
| 6,304,559 | B1 | 10/2001 | Jacklin et al. |
| 6,351,653 | B1 | 2/2002 | Alberth, Jr. et al. |
| 6,459,371 | B1 | 10/2002 | Pike |
| 6,459,882 | B1 | 10/2002 | Palermo et al. |
| 6,522,894 | B1 | 2/2003 | Schmidt |
| 6,671,379 | B1 | 12/2003 | Nemirovski |
| 6,681,022 | B1 | 1/2004 | Puthuff et al. |
| 6,688,421 | B1 | 2/2004 | Dyer et al. |
| 6,745,014 | B1 * | 6/2004 | Seibert et al. ............. 455/74.1 |
| 6,795,718 | B1 * | 9/2004 | Bae ......................... 455/575.2 |
| 6,819,762 | B1 | 11/2004 | Jones et al. |
| 7,035,608 | B1 | 4/2006 | Palermo et al. |
| 2002/0057746 | A1 * | 5/2002 | Chen ......................... 375/334 |
| 2002/0068600 | A1 | 6/2002 | Chihara et al. |
| 2002/0107053 | A1 | 8/2002 | Petez et al. |
| 2002/0160722 | A1 | 10/2002 | Terranova et al. |
| 2003/0059078 | A1 | 3/2003 | Downs, Jr. et al. |
| 2003/0092399 | A1 | 5/2003 | Davies |
| 2003/0100274 | A1 | 5/2003 | Brown |
| 2003/0120487 | A1 | 6/2003 | Wang |
| 2003/0207694 | A1 | 11/2003 | Legare et al. |
| 2003/0224825 | A1 | 12/2003 | Cox et al. |
| 2003/0224838 | A1 | 12/2003 | Skillicorn et al. |
| 2004/0022395 | A1 | 2/2004 | Turnbull |
| 2004/0198436 | A1 * | 10/2004 | Alden ..................... 455/556.1 |
| 2005/0164636 | A1 | 7/2005 | Palermo et al. |
| 2006/0073825 | A1 | 4/2006 | Palermo et al. |

OTHER PUBLICATIONS

Wireless Communications Headset Subsystem to Enhance Signaling.*

*Jtech Australia Pty Ltd.*, 2-Way Radios, printed Mar. 16, 2004, 2 pages {http://www.jtech.com.au/2way.asp?p=products}.

*Motorola Intelligence Everywhere*, MTH500 Motorola Tetra Portable Radio, 2001, 2 pages.

UHF Wireless Intercom, System 800, *Home Electronics, Inc.*, 2 pages {date unknown}.

*Earmark*, Base Stations: CON-KIT Base Station, printed Mar. 16, 2004, 2 pages {http://www.earmark.com/products/conbase.html}.

*Motorola Intelligence Everywhere*, Enhance your MTH650 tetra handportable terminal with a wide range of accessories, May 14, 2003, 6 pages.

*Logitech*, Mobile Phone Headsets, printed Apr. 6, 2004 {http://www.logitech.com/index.cfm/products/productlist/US/EN,crid=1627,ad=Igpr_mobile}.

*Eartec*, Voice activated or push to talk wireless, ProTalk UHF, printed Mar. 24, 2004, 3 pages, {http://www.eartec.com/protalk.html}.

*Jabra*, Freespeak 250, The cordless headset for bluetooth mobile phones, 2004, 2 pages.

*Eartec*, Heavy duty headsets, printed Mar. 24, 2004, 3 pages, {http://www.eartech.com/ultra.html}.

*The Bluetooth Weblog*, Frog Design/Motorola Offspring Wearables Concept, printed Aug. 4, 2003, 3 pages, {http://bluetooth.weblogs.com/discuss/msgReader$538?mode=topic}.

*Eartec*, Specialty Headset Communication Systems, Brochure {date unknown}.

Uniden WHAM Accessory Wireless Microphone Owner's Manual.

* cited by examiner

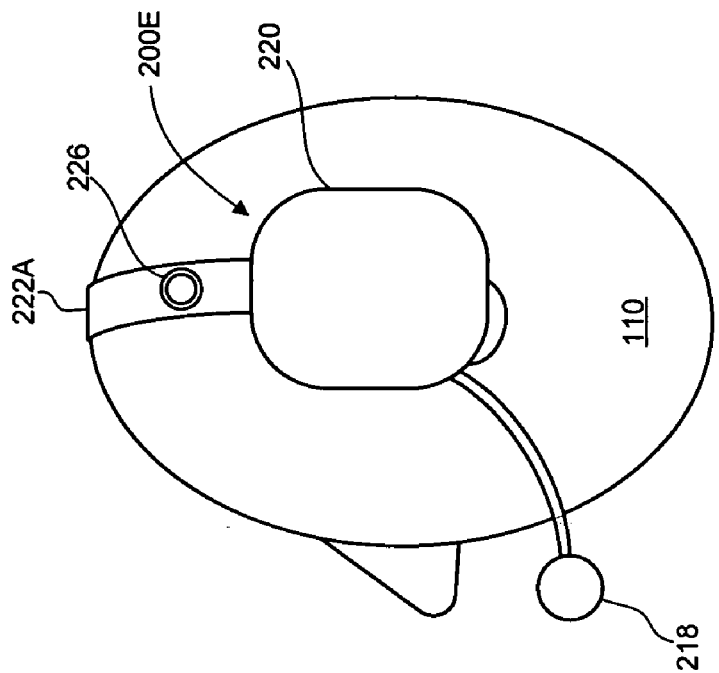
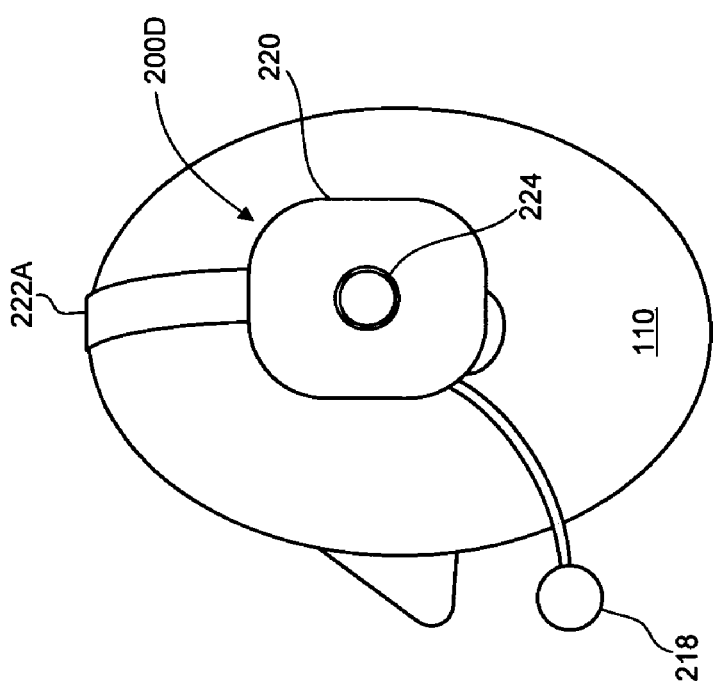
FIG. 2E
FIG. 2D

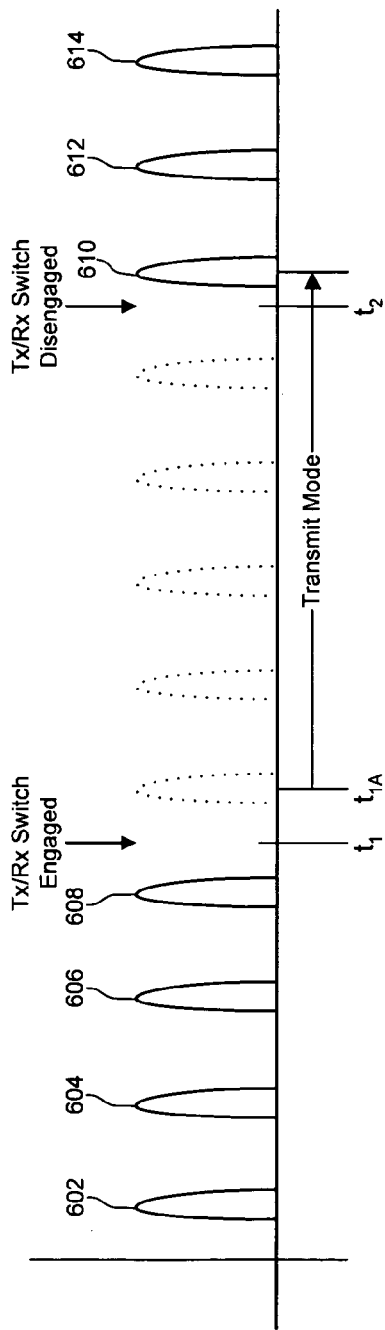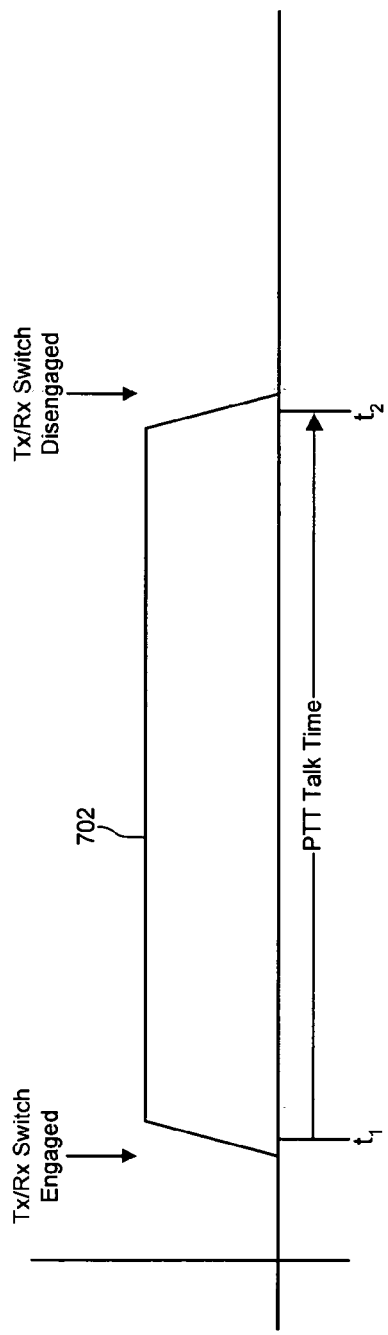

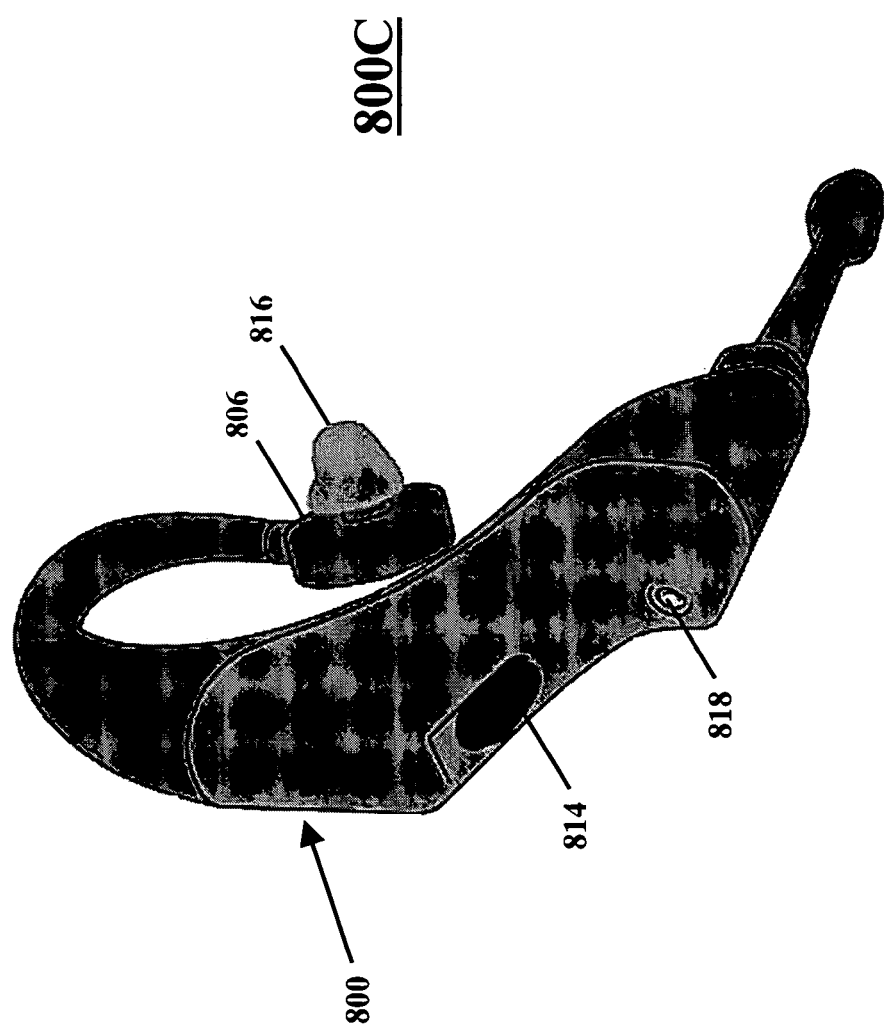

WIRELESS HEADSET FOR COMMUNICATIONS DEVICE

CROSS-REFERENCE TO RELATED APPLICATIONS

The present invention claims benefit of U.S. patent application Ser. No. 60/503,949, filed Sep. 19, 2003 and entitled "Wireless Headset for Two-Way Radios" and U.S. patent application Ser. No. 60/527,776, filed Dec. 9, 2003 and entitled "Wireless Headset for Communication Device," the entireties of which are incorporated by reference herein.

FIELD OF THE INVENTION

The present invention relates generally to half-duplex communications and more particularly to utilizing a push-to-talk (PTT) feature in a wireless headset.

BACKGROUND OF THE INVENTION

Half-duplex communications devices, such as two-way radios (or "walkie-talkies") and cellular phones having a half-duplex or similar service, such as the DIRECT CONNECT® cellular walkie-talkie service offered by Nextel Communications, Inc. of Reston, Va. or the Push to Talk Group Calling feature offered by Verizon Wireless of Bedminster, N.J., frequently are used to facilitate communications between mobile users, such as emergency personnel and construction workers. Because half-duplex communications devices generally are not configured to support simultaneous two-way communications, one or more mechanisms typically are implemented to help ensure that the half-duplex device is in a transmit mode only at the appropriate times. One such mechanism includes a voice operated (VOX) feature whereby a user's voice or other sound triggers the communications device to enter a transmit mode. Another mechanism includes a push-to-talk (PTT) button which places the communications device in a transmit mode while pressed or engaged and returns the communications device to a receive mode when the PTT button is released or disengaged. Thus, while the VOX feature benefits from not requiring the user to manipulate a button to switch the communications device between the transmit and receive mode, the VOX feature typically fails to operate accurately or correctly in noisy environments as the VOX feature often inadvertently interprets loud noises as a voice signal and therefore needlessly places the communications device in transmit mode. Accordingly, the use of a PTT button is frequently implemented for use in noisy environments.

Conventional implementations of PTT buttons (i.e., transmit/receive switches) are not without their drawbacks. For one, the location of the PTT button often causes significant inconvenience to the user. In many instances, the PTT button is located on the communications device which in turn is often placed about the user's body, thereby requiring the user to grasp for the communications device to engage the PTT button. Alternatively, some conventional implementations place the PTT button on a wire connecting a headset to the communications device. While this location for the PTT button may make it somewhat easier to quickly locate the PTT button, it will be appreciated that the wire is likely to become entangled with the user or with other equipment in the proximity due to its length and location.

Accordingly, improved techniques for implementing a PTT button functionality in a half-duplex communications device would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

In accordance with one embodiment of the present invention, a wireless headset is provided. The wireless headset comprises a switch for indicating a provision of audio information for transmission and means for wirelessly transmitting a signal representative of an engagement of the switch.

In accordance with another embodiment of the present invention, an apparatus is provided. The apparatus comprises an interface operably connected to a half-duplex communications device, a wireless interface; means for receiving a first transmit mode signal via the wireless interface, the transmit mode signal indicating a provision of audio information for transmission by the half-duplex communications device, and means for providing a second transmit mode signal to the half-duplex communications device via the interface to direct the half-duplex communications device to switch to a transmit mode.

In accordance with yet another embodiment of the present invention, a system is provided. The system comprises a half-duplex communications device and a headset wirelessly connected to the half-duplex communications device. The headset is adapted to wirelessly transmit a transmit mode signal-for reception by the half-duplex communications device, the transmit mode signal indicating a provision of audio information by the headset for transmission by the half-duplex communications device. The half-duplex communications device is adapted to transmit at least a portion of the audio information based at least in part upon receipt of the transmit mode signal.

In accordance with an additional embodiment of the present invention, a system is provided. The system comprises a half-duplex communications device, a transmit switch assembly wirelessly connected to the half-duplex communications device and a headset wirelessly connected to the half-duplex communications device. The transmit switch assembly is adapted to wirelessly transmit a transmit mode signal for reception by the half-duplex communications device, the transmit mode signal indicating a provision of audio information by the headset for transmission by the half-duplex communications device. The half-duplex communications device is adapted to transmit at least a portion of the audio information based at least in part upon receipt of the transmit mode signal.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIGS. 2A–2G are schematic diagrams illustrating exemplary placements of a transmit/receive switch in conjunction with a wireless headset in accordance with at least one embodiment of the present invention.

FIGS. 6 and 7 are diagrams illustrating exemplary push-to-talk engagement techniques in accordance with at least one embodiment of the present invention.

FIGS. 8A–8D are perspective views of an exemplary implementation of a wireless headset in accordance with at least one embodiment of the present invention.

DETAILED DESCRIPTION OF THE INVENTION

The following description is intended to convey a thorough understanding of the present invention by providing a number of specific embodiments and details involving the communication of information using multiple wireless channels. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For ease of illustration, the present invention is described herein in the context of a half-duplex communications system wherein a wireless channel is reserved for the transmission of information through the use of a PTT mechanism. However, using the guidelines provided herein, the present invention also may be implemented in pseudo-half-duplex communications systems, such as, for example, the DirectConnect® cellular phone feature offered by Nextel Communications of Reston, Va., or other communications systems wherein a PTT mechanism or similar transmit/receive switch mechanism is used to reserve a wireless channel for the transmission of information. Accordingly, reference herein to half-duplex includes true half-duplex and other similar communications techniques unless otherwise noted.

Figure 1A:
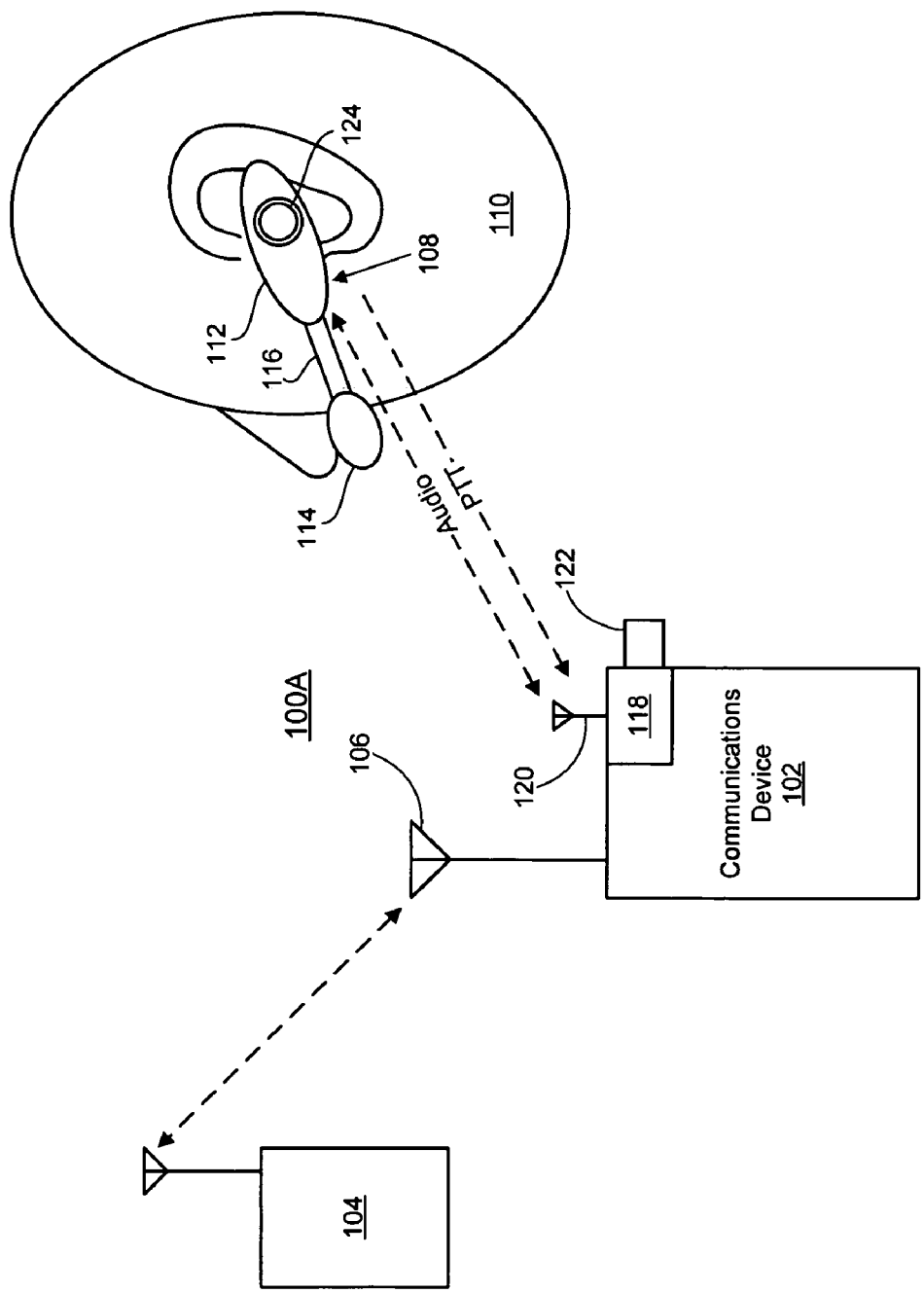
FIGS. 1A–1C are schematic diagrams of exemplary wireless communications systems implementing wireless headsets in accordance with at least one embodiment of the present invention.
Figure 1B:
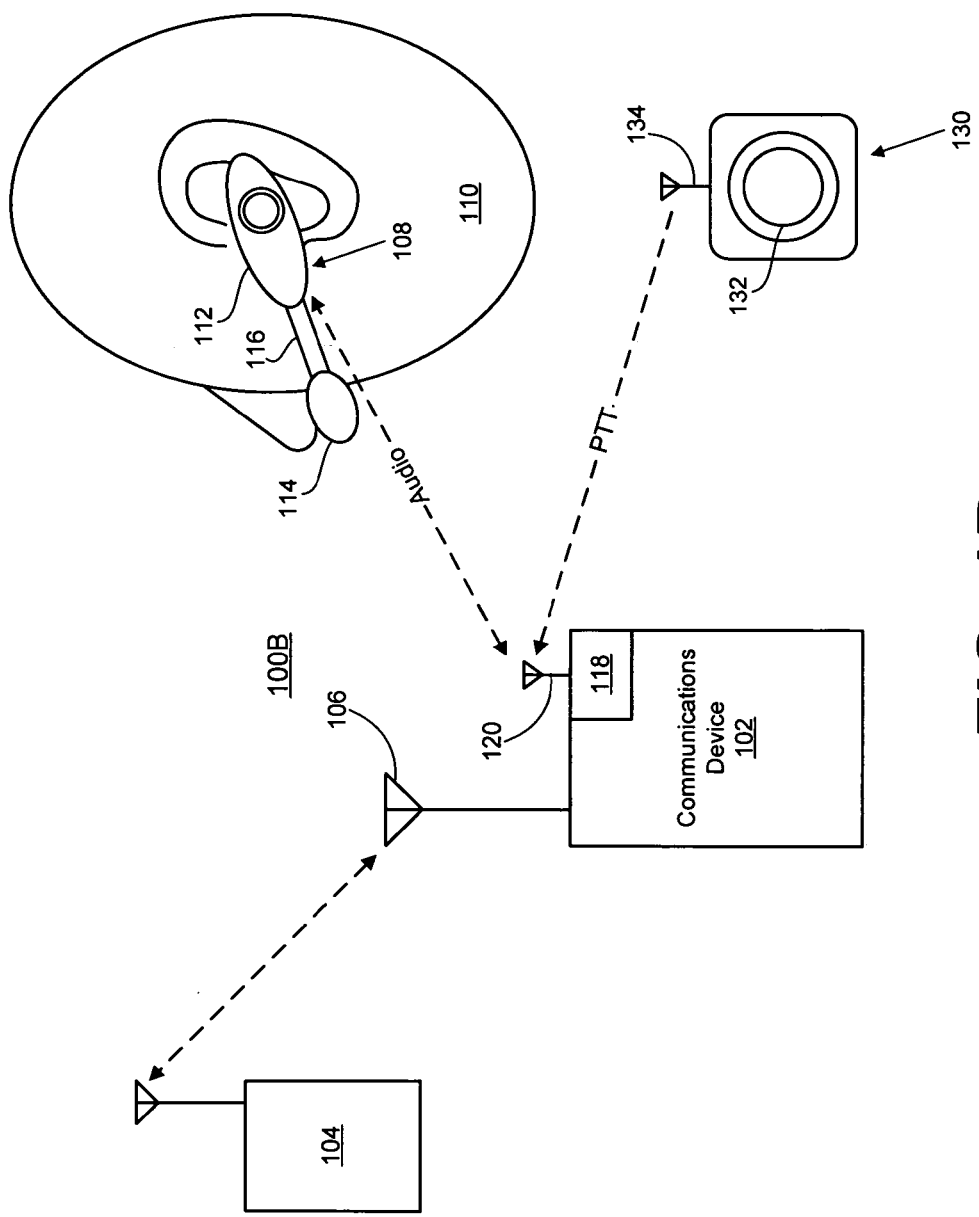
Figure 1C:
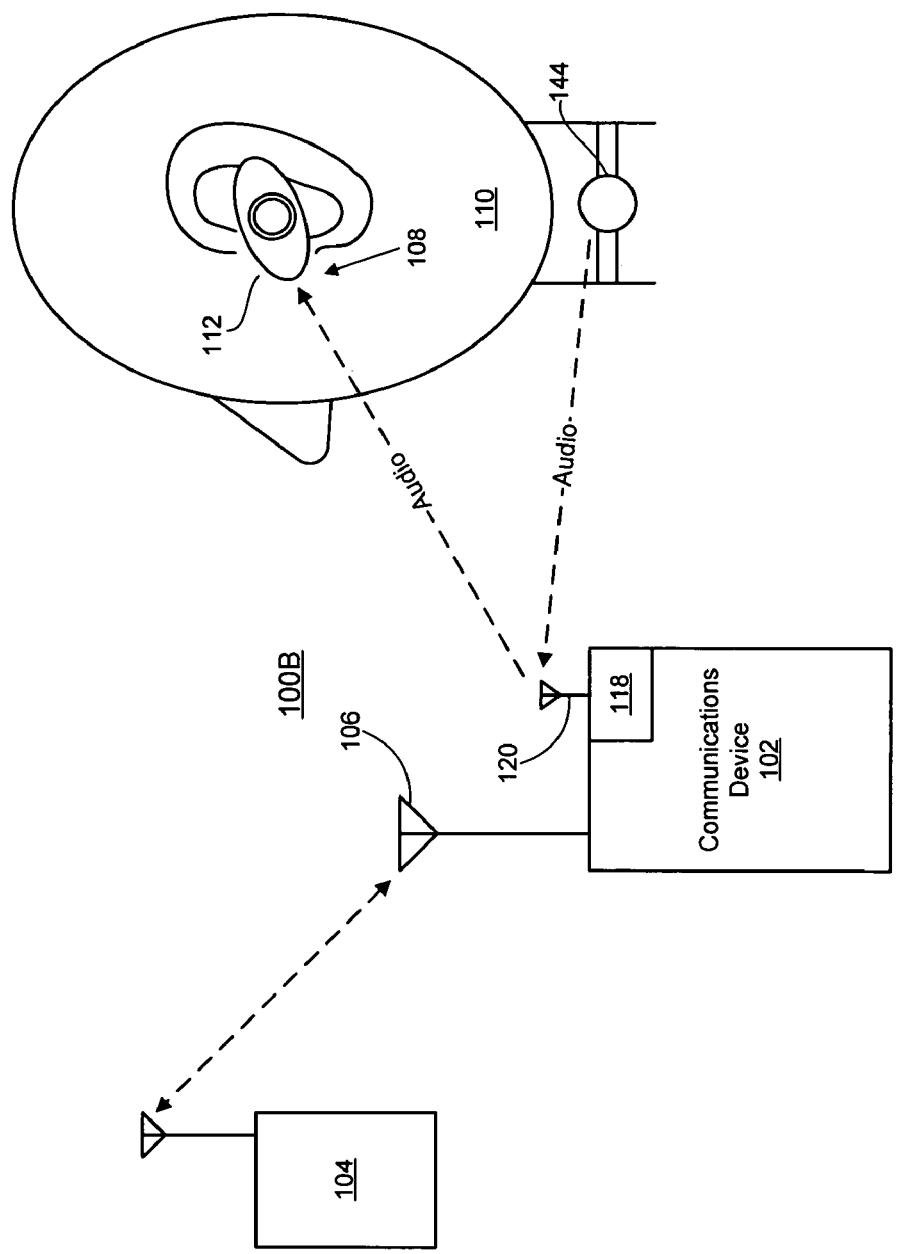

Referring now to FIGS. 1A–1C, exemplary half-duplex systems 100A, 100B and 100C are illustrated in accordance with at least one embodiment of the present invention. System 100A includes a communications device 102 (e.g., a half-duplex radio or cellular phone) in communication with another communications device 104. Communications between the devices 102 and 104 may be half-duplex transmissions and may be transmitted wirelessly via an antenna 106 or may be transmitted via a conductive wire, fiber optic cable, and the like.

In at least one embodiment, a wireless headset 108 is utilized to facilitate the transmission of audio information and other information (e.g., video information) between the communications device 102 and a user 110. As discussed below with reference to FIGS. 2A–2C, the headset 108 may be implemented as an earbud-type or ear-clip type headset which may utilize a relatively small headset body 112 operably connected to an earbud speaker (not shown) for outputting audio information and a microphone assembly 114 for inputting audio information (such as the vocalizations of the user 110). As depicted in the illustrated embodiment, the microphone assembly 114 may be operably connected to the headset body 112 via a boom 116. Alternatively, the microphone assembly 114 may be implemented on a wire connected to the headset body 112 which may be clipped to the clothing of the user 110, for example. The microphone assembly 114 may include any of a variety of microphones, including, but not limited to, throat microphones, boom microphones, bone induction microphones (i.e., microphones placed in the ear canal which pick up audio signals via vibrations in the ear canal), and the like.

As illustrated in greater detail with reference to FIGS. 2D–2G, the headset 108 alternately may be implemented as a headband-type headset having one or two ear pads or cups connected via one or more bands that encircle at least part of the head or neck of the user 110.

The headset 108 preferably is configured to wirelessly communicate audio information to and from the communications device 102. Accordingly, as discussed in detail below, the headset 108 may utilize a wireless interface comprising at least an antenna and a transceiver to transmit and receive analog and/or digital signals representative of audio information or other information. Accordingly, the communications device 102 may include a module capable of wirelessly communicating with the headset 108 via, for example, the antenna 106, or a wireless adapter 118 may be used to wirelessly relay information between the headset 108 and the communications device 102 via, for example, the antenna 106 or a separate antenna 120. To illustrate, the wireless adapter 118 may include a device that connects to a commercial radio handset (one embodiment of the communications device 102) via, for example, a socket or jack conventionally used to connect the radio handset to a wired headset. Audio information from the communications device 102 may be provided to the wireless adapter 118 via the socket or jack and the wireless adapter 118 may transmit the audio information wirelessly for reception by the headset 108. Conversely, audio information may be transmitted wirelessly from the headset to the wireless adapter 118 and the wireless adapter 118 then may provide an electric or optical signal representative of the audio information to the communications device 102 via the socket or jack.

As noted above, the communications device 102 may be configured to operate in a half-duplex communications mode and may rely on some type of transmission indication to indicate when the user 110 has audio information to transmit to the communications device 104. Conventionally, the transmission indication is supplied through the use of a transmit/receive switch positioned on or near the communications device which provides a signal that indicates that the transmission medium is reserved for the transmission of information by the communications device. Accordingly, in at least one embodiment, a transmit/receive switch is implemented to provide such a transmission indication, where the transmit/receive switch may include, for example, a push button, a toggle switch, a slide switch, a capacitive switch, and the like. The transmit/receive switch may be positioned on or near the communications device 102, such as, for example, the transmit/receive switch 122 connected to or implemented as part of the wireless adapter 118. Alternatively, the transmit/receive switch may be positioned on or operably connected to the wireless headset 108, such as, for example, the transmit/receive switch 124 positioned on the body 112 of the headset 108. To illustrate, the transmit/receive switch could be positioned on a side of the body 112 of the headset 108 that is facing or resting against the user's head such that the user 110 may press the body 112 of the headset 108 against the user's head to engage the transmit/receive switch.

In instances where the transmit/receive switch 124 is positioned on or connected to the wireless headset 108, the headset 108 may be configured to wirelessly transmit a signal representative of an engagement of the transmit/receive switch 124 to the wireless adapter 118, or, alternatively, to the communications device 102. Upon receipt of the signal representation of the engagement of the transmit/receive switch 124, the wireless adapter 118 may provide a corresponding signal to the communications device 102 to cause the communications device 102 to enter a transmit mode for the subsequent audio information provided from the headset 108.

Referring to FIG. 1B, an alternative implementation of a transmit/receive switch feature is illustrated as system 100B. Rather than, or in addition to, a transmit/receive switch positioned on the headset 108 or the wireless adapter 118, in one embodiment a wireless transmit/receive switch assembly 130 may be employed to provide a PTT-type transmit mode indication. Accordingly, the transmit/receive switch assembly 130 may be located in any of a number of useful locations within range of the communications device 102 without requiring one or more wires that may become entangled or otherwise hinder the user 110. In the illustrated example, the transmit/receive switch assembly 130 includes a transmit/receive switch 132 that may be engaged by the user 110 to indicate that audio information is to be transmitted, a power supply such as a battery (not shown) and processing hardware and software adapted to wirelessly transmit a PTT-type transmit mode indication to the wireless adapter 118 or the communications device 102 via, for example, an antenna 134 when the user 110 engages the transmit/receive switch 132.

Moreover, in at least one embodiment, the headset 108 may be configured to receive the transmit mode signal from the transmit/receive switch assembly 130 to determine whether the transmit/receive switch 134 has been engaged. If not engaged, the headset 108 may forgo the transmission of any audio information input by the microphone assembly 114 to minimize power consumption and/or to minimize or eliminate unintended transmissions such as, for example, when the user 110 is talking but does not intend to transmit via the communications device 102.

In addition to implementing a transmit/receive switch to enable a PTT-type functionality, the headset 108 may further be VOX enabled and therefore may implement a VOX-PTT switch to enable the user 110 to switch between VOX-type transmission handling and PTT-type transmission handling.

Referring to FIG. 1C, another exemplary embodiment of the headset 108 is illustrated. In the exemplary system 100C, a wireless microphone assembly 144 may be used to input and communicate audio information from the user 110 to the communications device 102. The wireless microphone assembly 144 preferably is adapted to detect and convert audio signals into a corresponding electrical signal and wirelessly transmit an analog or digital form of the electric signal to the adapter 118 or the communications device 102. The wireless microphone assembly 144 may include any of a variety of attachment mechanisms, such as straps, hook-and-loop fasteners, adhesives, magnets, etc., so that the wireless microphone assembly 144 may be fastened or otherwise positioned on or in proximity to the user 110. For example, as illustrate, the wireless microphone assembly 144 may implement a throat microphone placed in contact with the throat of the user 110 using one or more straps.

Figure 2B:
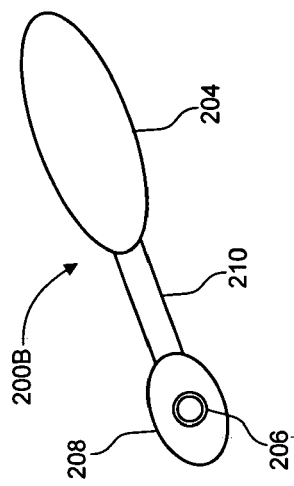
Figure 2C:
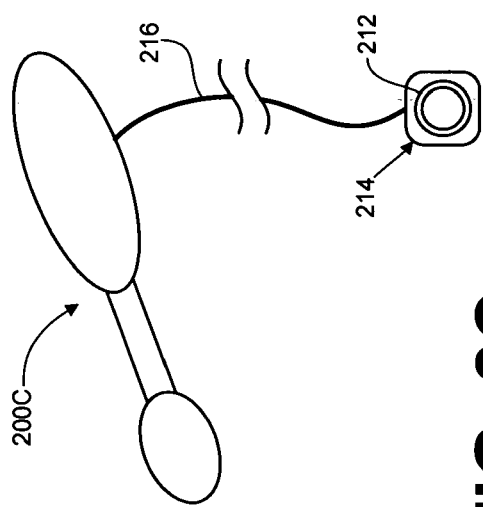
Figure 2A:
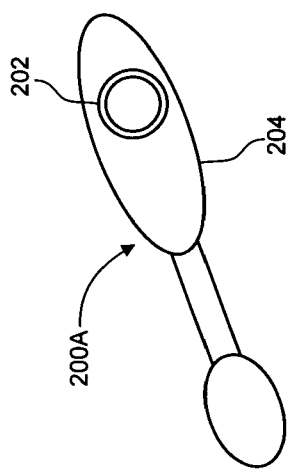

Referring now to FIGS. 2A–2E, various exemplary configurations of the wireless headset 108 are illustrated in accordance with at least one embodiment of the present invention. FIG. 2A illustrates a wireless earbud-type or earclip-type headset 200A wherein a transmit/receive switch 202 is positioned on a body 204 of the headset 200A. In this instance, the transmit/receive switch 202 preferably is positioned to be substantially coaxial with the ear canal (not shown) of the user 110 to prevent excess torque from moving the headset 200A or causing the headset 200A to twist out of the user's ear. However, in some instances, the placement of the headset 200A may be relatively secure and/or the transmit/receive switch 202 may be relatively sensitive to touch (e.g., a capacitive button) such that the transmit/receive switch 202 may be positioned elsewhere on the body 204, such as, for example, on the top, side, or bottom of the body 204.

FIG. 2B illustrates a wireless earbud-type or earclip-type headset 200B wherein a transmit/receive switch 206 is positioned on a microphone assembly 208, where the microphone assembly 208 may be connected to the body 204 via a boom 210. In such instances, a transmit/receive switch 206 relatively sensitive to touch preferably is employed so that a minimum amount of force may be employed by the user 110 to engage the transmit/receive switch 206.

Rather than positioning the transmit/receive switch directly on the headset, FIG. 2C illustrates an exemplary embodiment wherein a transmit/receive switch 212 is implemented as part of a transmit/receive switch assembly 214 connected to the main portion of an earbud-type or earclip-type headset 200C via at least one wire lead 216 which may be used to signal the headset 200C when the transmit/receive switch 212 is engaged. The transmit/receive switch assembly 214 may be clipped to some object on the user 110, such as, for example, a collar of the user's shirt or a helmet or hat worn by the user.

Although FIGS. 2A–2C depict exemplary configurations of a transmit/receive switch on a wireless headset 108, the present invention is not limited to these configurations. To illustrate, in one embodiment, the transmit/receive switch may be positioned on an interior side of the headset 108 and placed in contact with, or next to, the face or ear of the user 110 such that when the user 110 places pressure on the distal side of the headset 108, the headset 108 is pressed closer to the face or ear of the user 110, thereby engaging the transmit/receive switch. As another example, the speaker of the headset 108 may be implemented as a ear piece that is inserted in or near the ear canal of the user 110 (as illustrated with reference to FIGS. 8A–8D) and the transmit/receive switch may be integrated into the connection between the ear piece and the body of the headset 108 such that when the user 110 places pressure on the body of the headset 108 in the direction of the user's head, the connection is compressed, thereby engaging the transmit/receive switch. Using the guidelines provided herein, those skilled in the art may implement various transmit/receive switch positions and configurations without departing from the spirit or the scope of the present invention.

Figure 2G:
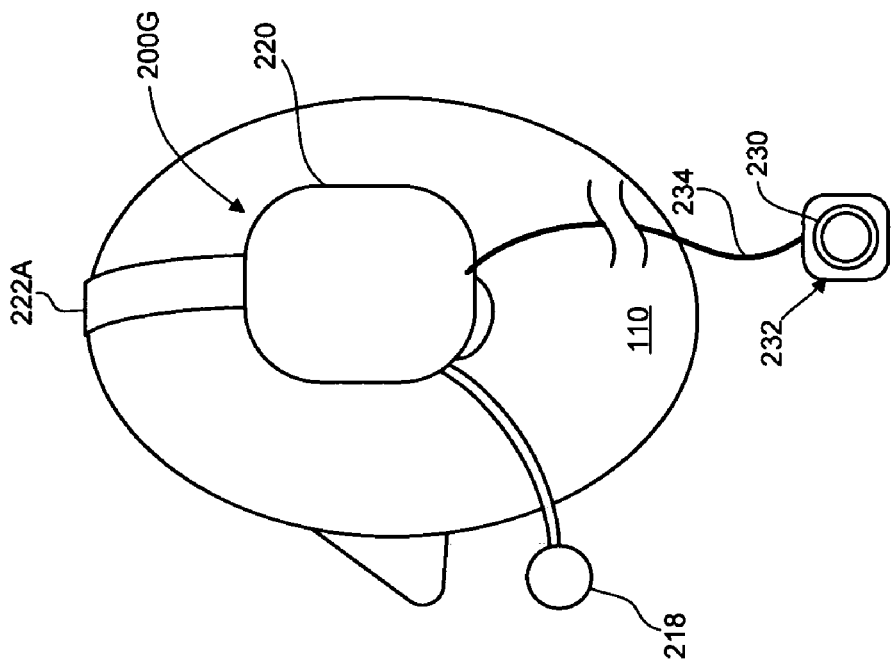
Figure 2F:
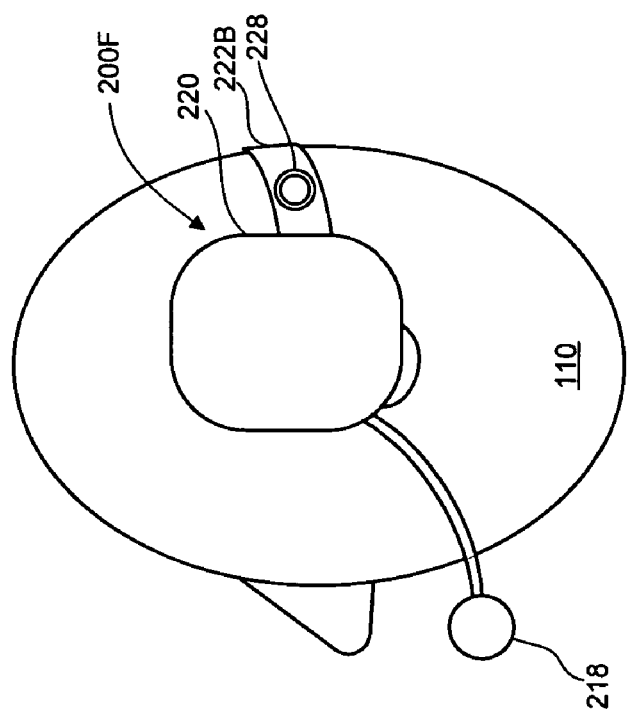

As illustrated in FIGS. 2D–2G, the wireless headset 108 alternatively may be implemented as a headband-type headset having a microphone assembly 218 one or two earpads 220 connected via one or more headbands 222A or 222B that may be positioned over and/or behind the head of the user 110. FIG. 2D illustrates an exemplary headband-type headset 200D wherein a transmit/receive switch 224 may be positioned on the earpad 220. However, because the earpad 220 is larger and more secure than the earbud-type microphones described above, a more substantial transmit/receive switch may be used, as it is less likely that the user 110 is likely to dislodge the earpad 220 when engaging the transmit/receive switch 224. FIG. 2E illustrates an exemplary headband-type headset 200E wherein a transmit/receive switch 226 is positioned on a headband 222A secured over the top of the user's head. Similarly, FIG. 2F illustrates an exemplary headband-type headset 200F wherein a transmit/receive switch 228 is positioned on a headband 222B secured behind the user's head. FIG. 2G illustrates an exemplary headband-type headset 200G wherein a transmit/receive switch 230 is implemented as part of a transmit/receive switch assembly 232 and operably connected to the main portion of the headset 200G via one or more wire leads 234.

Figure 3:
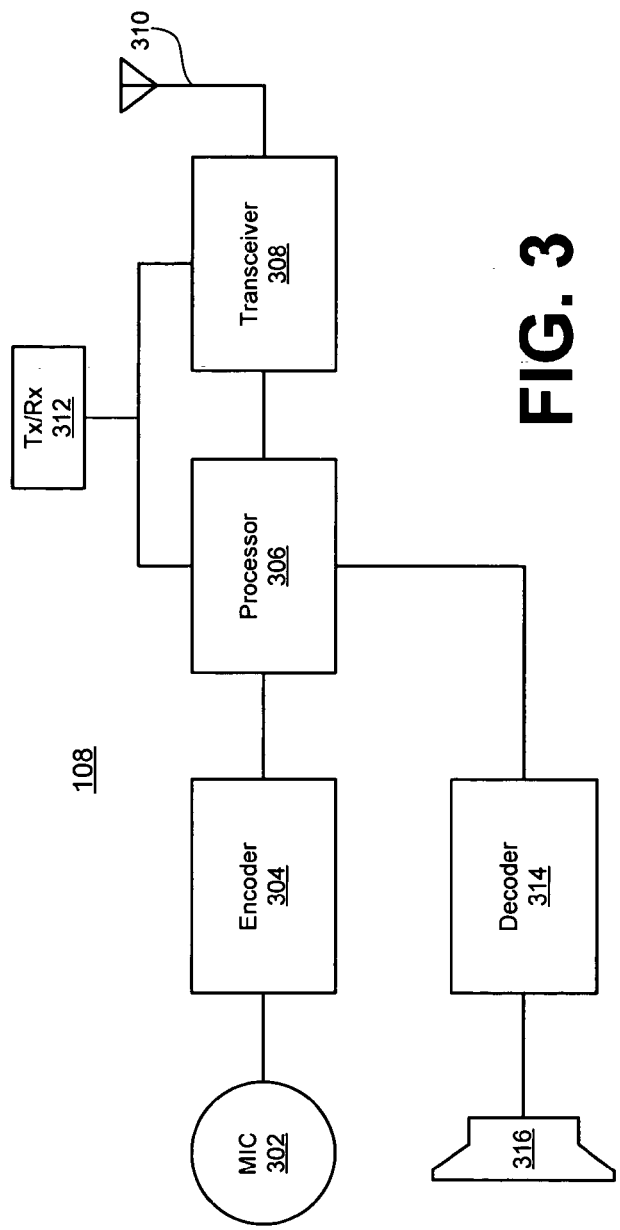
FIG. 3 is a schematic diagram of an exemplary wireless headset in accordance with at least one embodiment of the present invention.

Referring now to FIG. 3, an exemplary functional implementation of the wireless headset 108 is illustrated in accordance with at least one embodiment of the present invention. In the illustrated example, audio information and other information may be transmitted from and received by the headset 108 in a packetized form. Accordingly, audio information from the user 110 (such as vocalizations from the user 110) are received by a microphone assembly 302 and converted to a representative analog signal. The analog signal is digitized by an encoder 304 and the digital information is provided to one or more processors 306 for packetization as well as other processing as appropriate (such as, for example, filtering, adjusting the gain, encrypting the data, etc.). Alternatively, the audio information may be input by the wireless microphone assembly 144 (FIG. 1C) and a wireless signal representative of the audio information may be transmitted from the wireless microphone assembly 144 to the headset 108 or the adapter 118 in an analog or digital form.

In one embodiment, the packetization process includes segmenting the digital information by a certain number of bits (e.g., sixteen bits) and forming a packet for each segment by proceeding the segment with a training bit sequence and/or an authorization code so that the communications device 102 may correctly identify the packet. The packet then may be transmitted to the communications device 102 via a transceiver 308 and an antenna 310. In at least one embodiment, the transceiver and antenna 310 operate in one or more of the 800 megahertz (MHz), 900 MHz or 2.4 gigahertz (GHz) frequency bands, although other operating frequencies may be utilized as appropriate. For example, the present invention may advantageously implement one or more ultrawide band (UWB) mechanisms to wirelessly transmit information between one or more components.

As noted above, the wireless headset 108 preferably is implemented with a half-duplex communications device 102 (FIGS. 1A and 1B) wherein a PTT-type transmit mode indication is used to direct the communications device 102 to enter a transmit mode. Accordingly, in at least one embodiment, the transmit/receive switch 312 is operably connected (e.g., wirelessly, by conductive wire, by optical fiber, etc.) to the processor 306 or the transceiver 308, whereby the processor 306 or the transceiver 308 may be activated for the packetization and transmission of audio information only when the transmit/receive switch 312 is engaged to minimize power consumption as the transmission of packetized audio information from the headset 108 typically is of little use when the communications device 102 is not in a transmit mode. In instances wherein the transmit/receive switch 312 is wirelessly connected to the headset 108 (e.g., transmit/receive switch assembly 130 of FIG. 1B), a signal representative of the engagement of the transmit/receive switch 312 may be received via the antenna 310 and transceiver 308 or a separate antenna and/or transceiver may be implemented to receive this signal.

Packetized audio information transmitted from the wireless adapter 118 (FIGS. 1A and 1B) or directly from the communications device 102 is received via the antenna 310 and transceiver 308, depacketized by the processor 306 and provided to a decoder 314 for conversion to an analog signal representative of the audio information. The analog signal then may be used to drive a speaker 316 to output the audio information as sound for detection by the user 110. As discussed above, the speaker 316 may be implemented in a earbud or ear insert placed in or near to an ear canal of the user 110, in an earpiece of the headset which covers at least a portion of the ear, and the like.

Although an exemplary implementation of the headset 108 using digital transmission techniques is described above, other known analog or digital transmission techniques may be implemented to communicate information between the headset 108, the wireless adapter 118 and/or a wireless transmit/receive switch assembly without departing from the spirit or the scope of the present invention. To illustrate, one or more of the headset 108, the wireless adapter 118/communications device 102 and the transmit/receive switch assembly 130 may be enabled to communicate in accordance with one or more BLUETOOTH® wireless communications standards.

Figure 4:
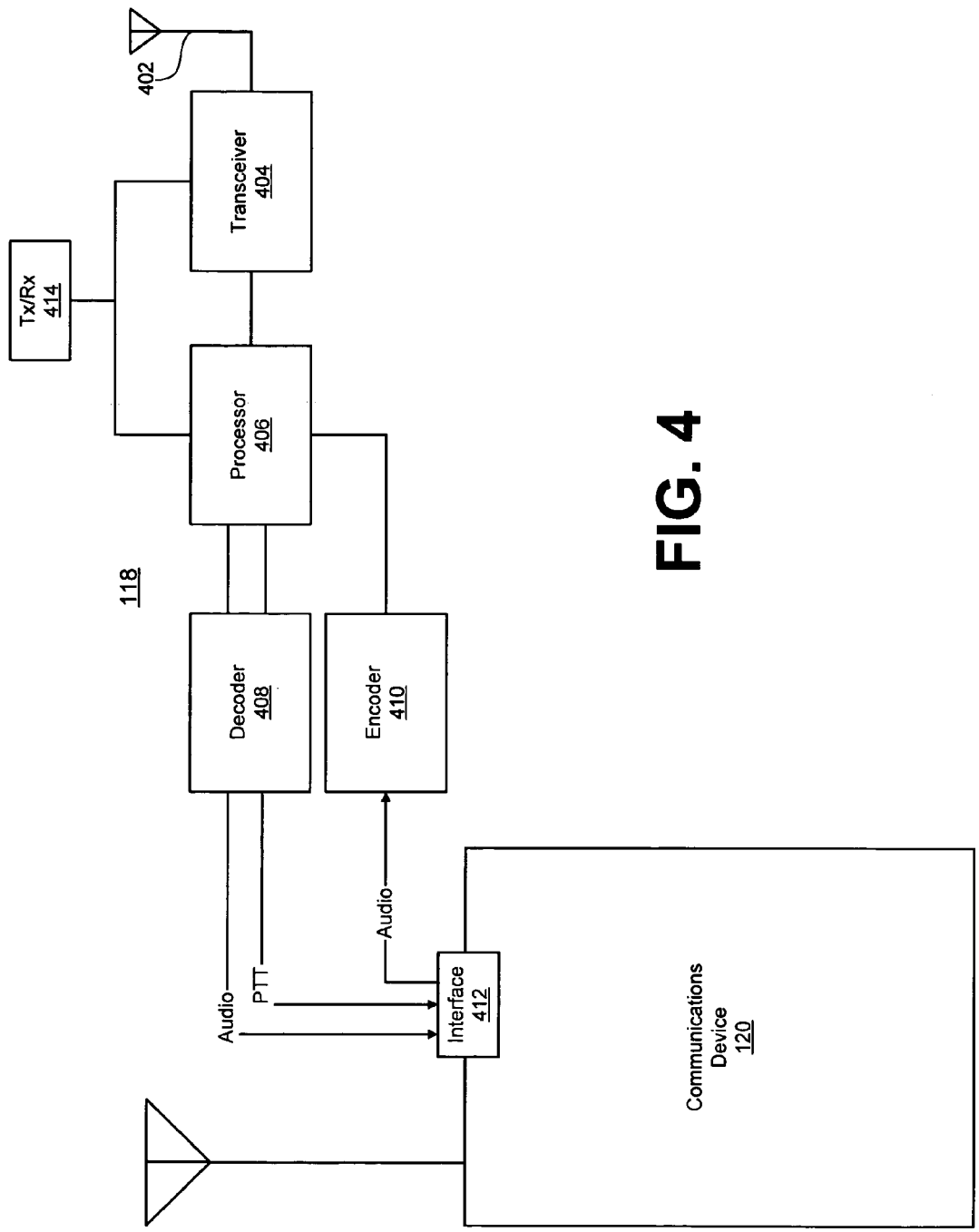
FIG. 4 is a schematic diagram of an exemplary wireless adaptor for a communications device in accordance with at least one embodiment of the present invention.

Referring now to FIG. 4, an exemplary implementation of the wireless adapter 118 is illustrated in accordance with at least one embodiment of the present invention. In the illustrated example, the wireless adapter 118 includes an antenna 402, a transceiver 404, one or more processors 406, a decoder 408 and an encoder 410. Although the adapter 118 is illustrated and described as separate from the communications device 102 for ease of discussion, in at least one embodiment, the adapter 118 is integrated into the communications device 120 (i.e., as a module added to the overall design). Accordingly, the following description below applies to both a separate adapter 118 or an integrated adapter 118 unless otherwise noted.

As discussed above, in at least one embodiment, audio information or other information may be transmitted between the wireless adapter 118, the headset 108 and/or the transmit/receive switch assembly 130 as packetized digital information. Accordingly, packetized digital information from the headset 108 or transmit/receive switch assembly 130 may be received by the antenna 402 and depacketized by the transceiver 404 or processor 406. The processor 406 may further process the information (e.g., analyze the access code associated with a packet to determine whether to continue processing the packet) and provide the information to the decoder 408, whereupon it may be converted from digital to analog form. The analog signal representing the information then may be provided to the communications device 102 via an interface 412.

Conversely, audio information and other information from the communications device 102 may be provided to the encoder 410 via the interface 412 for conversion from an analog form to a digital form. The digital information then may be provided to the processor 406 for packetization and additional processing, and the packets of information may be transmitted for reception by the headset 108 via the transceiver 404 and antenna 402. Although wireless communications between the headset 108, adapter 118 and/or the wireless transmit/receive switch assembly 130 may be conducted at any suitable frequency or frequency band, the 800 megahertz (MHz), 900 MHz, and 2.4 GHz bands preferably are utilized.

The interface 412 may include any of a variety of interfaces typically used to connect the communications device 102 to a conventional wired headset and wired PTT button. For example, the interface 412 may include, but is not limited to, any of the following: an Assembled HT1000 Style Accessory Interface, an Assembled HT750/HT1250 Style Accessory Interface, a 3.5 mm Threaded Plug Accessory Interface or a 6-pin Hirose Accessory Interface, a 2.5/3.5 mm Right Angle Overmolded Accessory interface, all of which are frequently used on a number of MOTOROLA two-way radios; a 2.5 mm accessory and data cable connector input jack frequently used on cellular telephones such as the MOTOROLA i60C; and the like.

In an alternate embodiment, communications between the headset 108 and the adapter 118 are conducted by way of two or more separate channels in a spread spectrum, at least one channel for transmitting audio and other information from the wireless adapter 118 and at least one other channel for transmitting audio and other information from the headset 108. Moreover, one or more UWB techniques, or similar techniques, may be implemented.

Rather than, or in addition to, receiving a wireless signal from the headset 108 or the wireless transmit/receive switch assembly 130 that indicates that the user 110 has engaged a transmit/receive switch, the adapter 118 may implement a transmit/receive switch 414 which may be engaged by the user 110 to a PTT signal to be submitted to the communications device 102 via the interface 414 either directly or via the processor 406.

Figure 5:
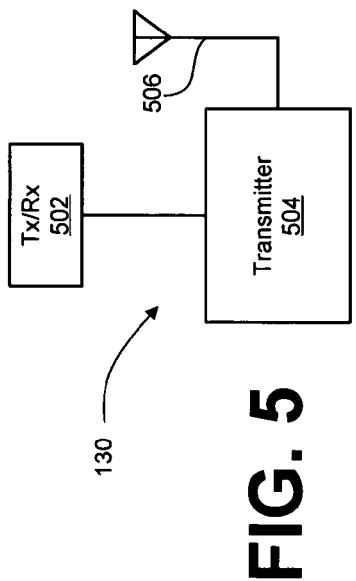
FIG. 5 is a schematic diagram of an exemplary wireless transmit/receive switch assembly in accordance with at least one embodiment of the present invention.

Referring now to FIG. 5, an exemplary implementation of the wireless transmit/receive switch assembly 130 is illustrated in accordance with at least one embodiment of the present invention. In the illustrated example, the transmit/receive switch assembly 130 comprises a transmit/receive switch 502, a transmitter 504 and an antenna 506. The transmitter 504 may include a processor/transceiver combination as described above, or the transmitter 504 may include an analog or digital design, or combination thereof, suitable to transmit a signal that indicates to the communications device 102 that audio information is to be transmitted. The signal may include an actual transmitted signal that represents the engagement of the transmit/receive switch 502 or the signal may be represented by a cessation of a transmitted signal, where the cessation indicates that the transmit/receive switch 502 has been engaged.

Referring now to FIGS. 6 and 7, exemplary methods 600 and 700, respectively, for providing a signal representative of an engagement of a transmit/receive switch are illustrated. The methods 600 and 700 may be implemented by the headset 108 to indicate its transmit/receive switch 124 (FIG. 1) has been engaged or may be implemented by the wireless transmit/receive switch assembly 130 to indicate that its transmit/receive switch 132 has been engaged. For ease of discussion, the exemplary methods 600 and 700 are described as applied by the wireless transmit/receive switch assembly 130.

In the illustrate example of FIG. 6, a periodic transmission of chirps (e.g., chirps 602–614) by the transmitter 504 indicate that the transmit/receive switch 502 has not been engaged. The chirps may include, for example, a transmission burst at a particular frequency and for a particular duration, a particular signal pattern, or a particular digital sequence that is identified by the processor 406 (FIG. 4) of the wireless adapter 118 as being a signal chirp from the transmit/receive switch assembly 130.

When the transmit/receive switch 502 is engaged (e.g., at time $t_1$), the transmitter 504 may be configured to cease the transmission of periodic chirps until the transmit/receive switch 502 is disengaged (e.g., at time $t_2$). Accordingly, the processor 406 (and/or the processor 306 of the headset 108) may be configured to note the cessation or absence of an expected chirp at time $t_{1A}$ as an indication or signal that the transmit/receive switch 502 is engaged and therefore signals the communications device 102 to enter a transmit mode by, for example, providing a conventional PTT signal to the communications device 102 via the interface 412 (FIG. 4). The adapter 118 may continue to provide the signal or indication to the communications device 102 until the transmission of chirps is resumed after time $t_2$.

Alternatively, as illustrated in FIG. 7, the transmitter 504 may be adapted to transmit a signal 702 while the transmit/receive switch 502 is engaged (e.g., between times $t_1$ and $t_2$) and cease transmitting the signal 702 once the transmit/receive switch 502 is disengaged. In this instance, the wireless adapter 118 may provide, for example, a conventional PTT signal to the communications device 102 via the interface 412 for the duration that the signal 702 is received at the wireless adapter 118 so that the communications device 102 enters a transmit mode for this duration.

Figure 8A:
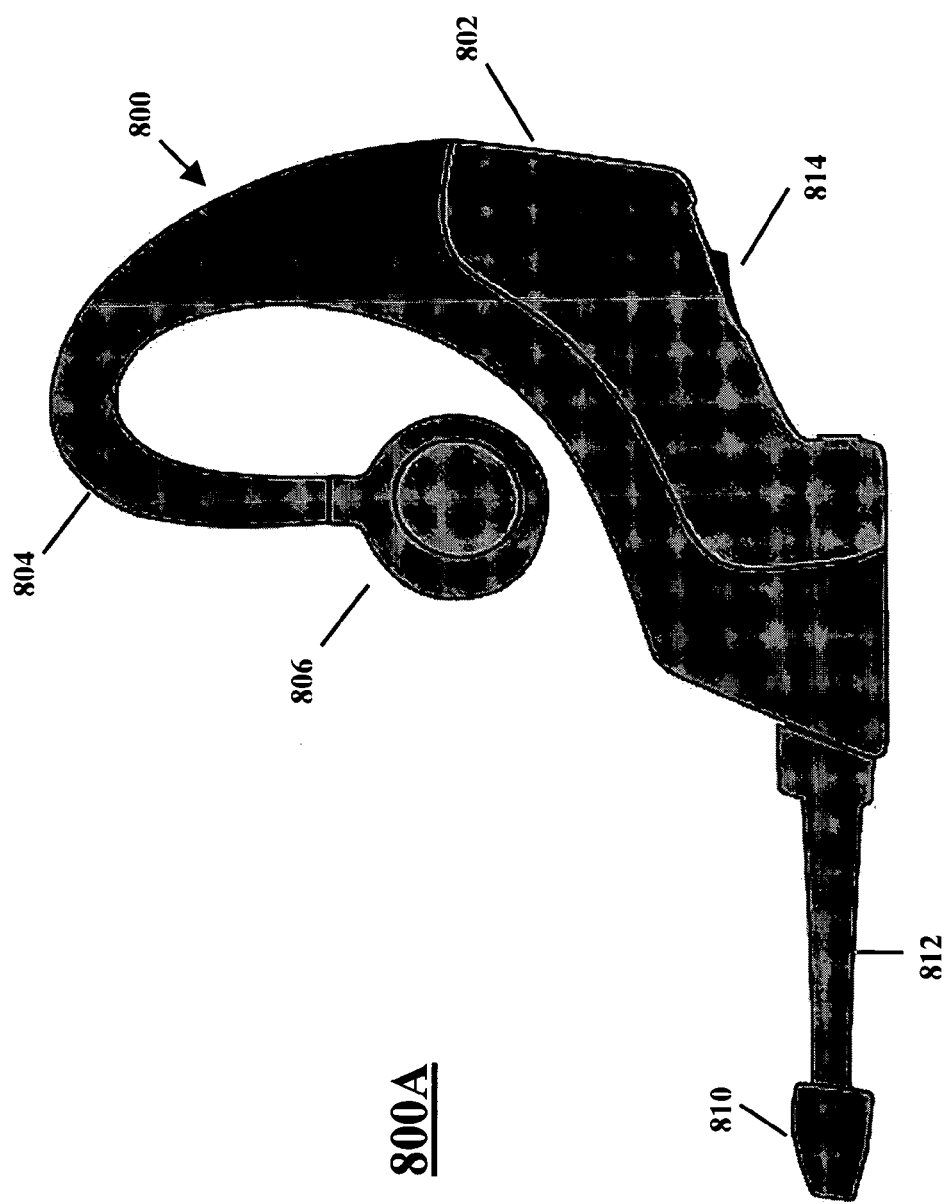

Referring now to FIGS. 8A–8D, another exemplary implementation of the wireless headset 118 (depicted as headset 800) is illustrated in accordance with at least one embodiment of the present invention. FIG. 8A depicts a side view 800A of the headset 800, wherein the headset 800 includes a main body 802 mounted to user's ear by way of an ear clip section 804. The ear clip section 804 terminates at a earpiece 806 having an ear insert (see FIGS. 8B and 8C) on one side and a transmit/receive switch 808 on the other such that the transmit/receive switch 808 is substantially coaxial with the ear insert and therefore is substantially coaxial with the ear canal of the user's ear. The main body 802 is further connected to a microphone assembly 810 by way of a boom 812. The main body 802 also may include a VOX/PTT switch 814 that may be operated by a user to switch the headset 800 between a PTT-based mode and a VOX-based mode.

Figure 8B:
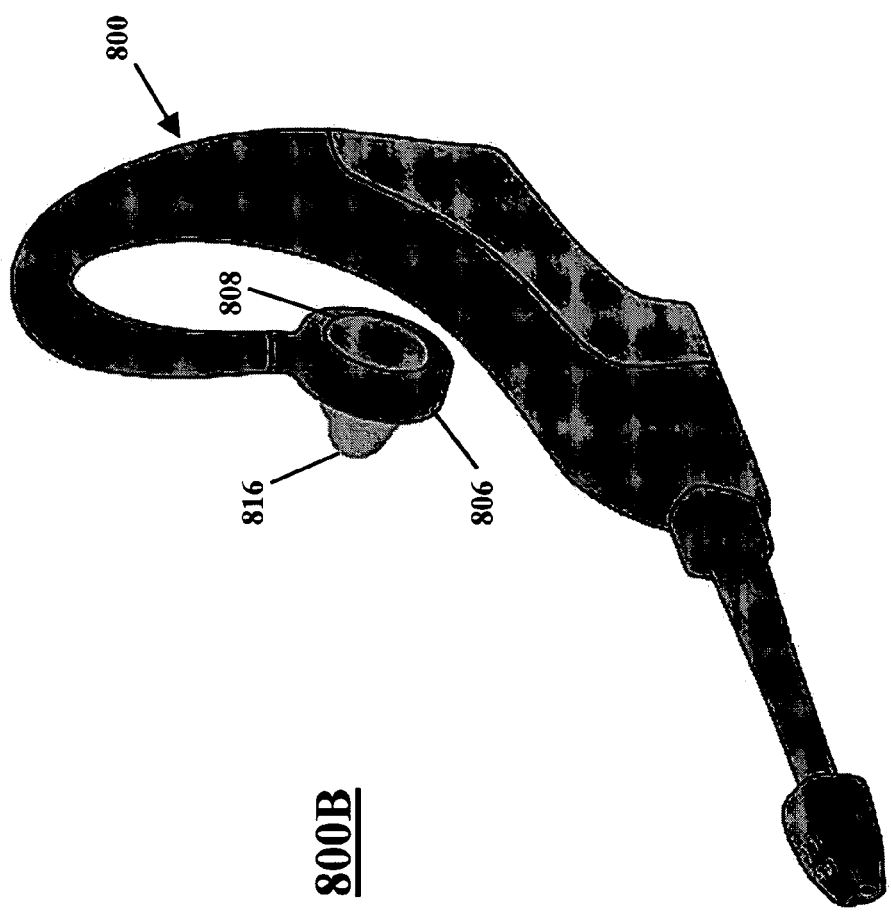
Figure 8D:
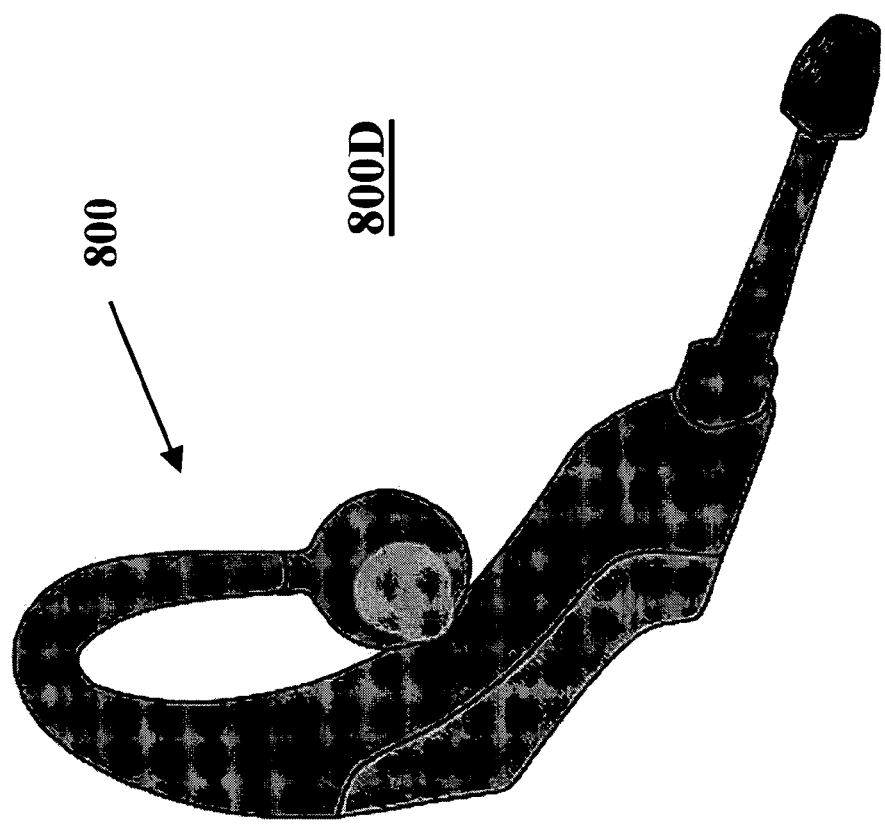

FIG. 8B depicts a front perspective view 800B of the headset 800. As illustrated, the earpiece 806 includes an ear insert 816 on one side and the transmit/receive switch 808 on the other side. The ear insert 816 may comprise conforming gel or other elastic or semi-elastic material that forms to the contours of the user's ear canal to ensure a more secure fit. Commercial implementations of suitable ear inserts 816 include, for example, JABRA EarGels® or JABRA Mini-Gels™ available from JABRA Corporation of Copenhagen, Denmark. FIG. 8C depicts a bottom perspective view 800C of the headset 800. As illustrated, the headset 800 may implement a power supply jack 818 to recharge one or more batteries (not shown) used to power the headset 800. FIG. 8D depicts a bottom perspective view 800D of the headset 800.

Figure 9:
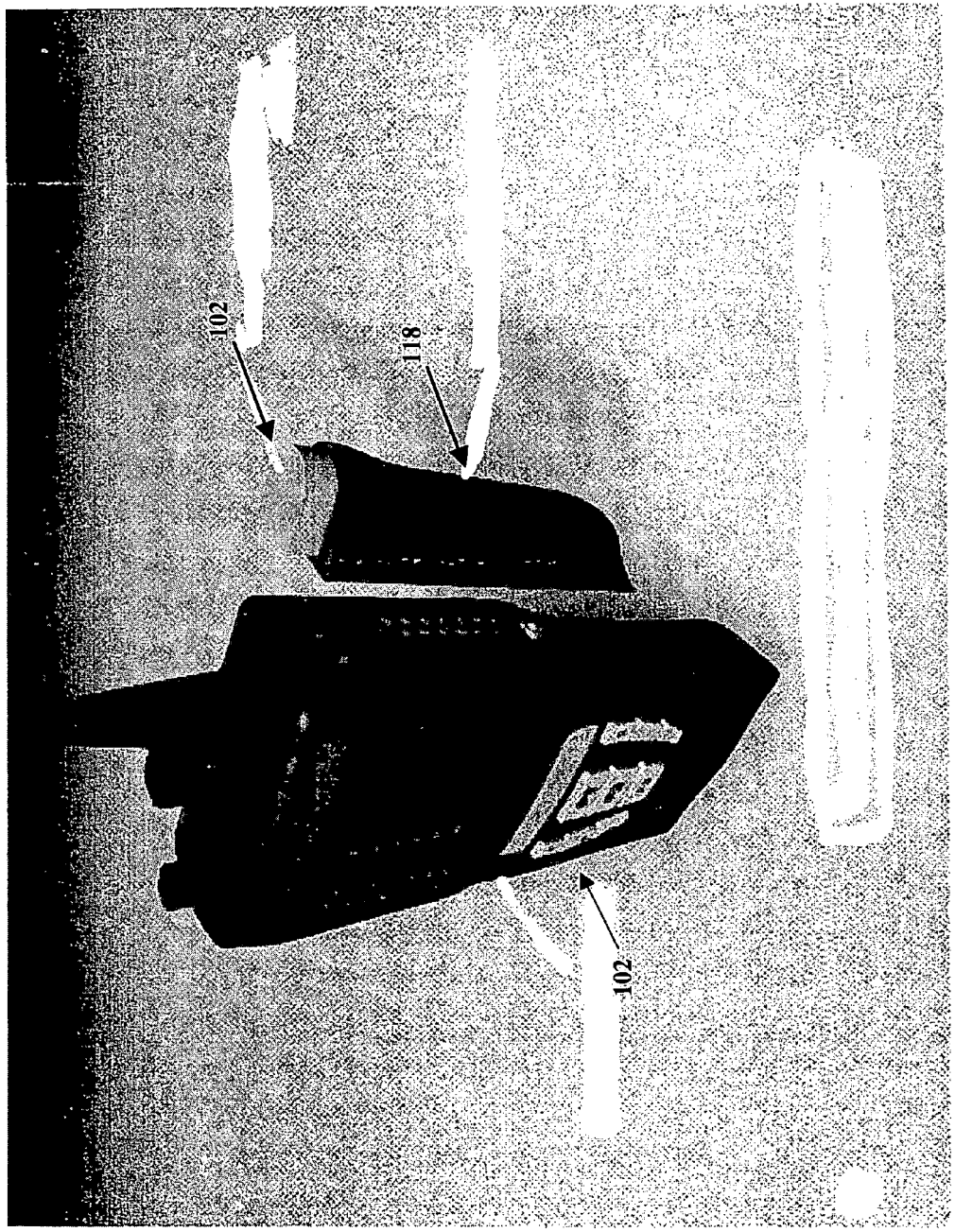
FIG. 9 is a perspective view of an exemplary implementation of a wireless adapter in accordance with at least one embodiment of the present invention.

Referring now to FIG. 9, an exemplary implementation of the wireless adapter 118 and communications device 102 is illustrated. As depicted, the adapter 118 may include a transmit/receive switch 902 (a button in the illustrated example) which may serve as a backup to a transmit/receive switch on the wireless headset 108 (FIG. 1A) or the wireless transmit/receive switch assembly 130 (FIG. 1B). The adapter 118 may be affixed to the communications device 102 (e.g., a two-way radio in the illustrated example) via set screws, VELCRO®-type hook and loop fasteners, straps, adhesive, clamps and the like. Alternatively, the wireless adapter may be operably connected to the communications device 102 via one or more conductive or optic wires so that the wireless adapter 118 may be positioned closer to the wireless headset 108.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. An apparatus for wirelessly communicating audio information to and from a half-duplex radio, the apparatus comprising:
    an adapter for connection to a portable half-duplex radio, and
    a wireless headset for wirelessly communicating information to the adapter; wherein
    said wireless headset comprises:
        a body to be worn on a user's head;
        a speaker assembly included in the body to output audio information to the user;
        a microphone assembly included in the body to receive audio information from the user;
        a switch positioned on the body;
        an encoder to convert an analog signal representative of the audio information from the user to digital signal;
        a processor connected to the encoder to packetize the digital signal; and
        a transceiver to wirelessly transmit a first transmit mode signal representative of an engagement of the switch to the adapter and to wirelessly transmit the packetized digital signal of the audio information; and said adapter comprises:
        an interface for connection to the portable half-duplex radio;
        a transceiver to receive the first transmit mode signal directly from the wireless headset; and
        a processor connected to the interface to provide a second transmit mode signal to the half-duplex radio upon receipt of the first transmit mode signal, the second transmit mode signal for causing the half-duplex radio to enter a half-duplex transmission mode.

2. The apparatus as in claim 1, wherein the switch is positioned on the microphone assembly.

3. The apparatus as in claim 1, wherein the speaker assembly includes an earbud speaker.

4. The apparatus as in claim 1, wherein the body forms an earclip.

5. The apparatus as in claim 4, wherein the speaker assembly includes an ear insert for insertion into the user's ear canal.

6. The apparatus as in claim 5, wherein the ear insert comprises a conformable material.

7. The apparatus as in claim 5, wherein the switch is positioned substantially coaxially with the ear insert.

8. The apparatus as in claim 1, wherein said wireless headset further comprises a headband.

9. The apparatus as in claim 1, wherein the signal representative of an engagement of the switch includes a signal transmitted during at least a portion of a period that the switch is engaged.

10. The apparatus as in claim 1, wherein the signal representative of an engagement of the switch includes an absence of a signal during at least a portion of a period that the switch is engaged.

11. The apparatus as in claim 1, wherein the adapter processor receives audio information via the adapter transceiver and provides the audio information to the half-duplex radio via the interface.

12. The apparatus as in claim 1, wherein the adapter processor receives audio information from the half-duplex communications device radio via the interface and transmits at least a portion of the audio information via the adapter transceiver.

13. The apparatus as in claim 1, wherein the adapter is integrated with the half-duplex radio.

14. The apparatus as in claim 1, wherein the adapter is separate from the half-duplex radio.

* * * * *

UNITED STATES PATENT AND TRADEMARK OFFICE
CERTIFICATE OF CORRECTION

| | | |
|---|---|---|
| PATENT NO. | : 7,149,552 B2 | Page 1 of 1 |
| APPLICATION NO. | : 10/828480 | |
| DATED | : December 12, 2006 | |
| INVENTOR(S) | : John Lair and Anthony J. Sutera | |

It is certified that error appears in the above-identified patent and that said Letters Patent is hereby corrected as shown below:

On the face of the patent, at (75) Inventors, please insert after "John Lair, Salt Lake City, UT (US)" the following:

--Anthony J. Sutera, Midway, UT (US)--; add --et al-- after "Lair" at top of title page, item (12).

Signed and Sealed this

Eighteenth Day of September, 2007

JON W. DUDAS
*Director of the United States Patent and Trademark Office*